United States Patent
Shim et al.

(10) Patent No.: US 10,448,349 B2
(45) Date of Patent: Oct. 15, 2019

(54) CELL ID DETERMINATION METHOD AND DEVICE IN WIRELESS COMMUNICATION SYSTEM

(71) Applicant: Samsung Electronics Co., Ltd., Suwon-si, Gyeonggi-do (KR)

(72) Inventors: Seijoon Shim, Suwon-si (KR); Hayoung Yang, Yongin-si (KR); Joohyun Lee, Suwon-si (KR); Soongyoon Choi, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 0 days.

(21) Appl. No.: 15/754,805

(22) PCT Filed: Aug. 31, 2016

(86) PCT No.: PCT/KR2016/009680
§ 371 (c)(1),
(2) Date: Feb. 23, 2018

(87) PCT Pub. No.: WO2017/039293
PCT Pub. Date: Mar. 9, 2017

(65) Prior Publication Data
US 2018/0270770 A1 Sep. 20, 2018

(30) Foreign Application Priority Data
Sep. 2, 2015 (KR) .................. 10-2015-0124262

(51) Int. Cl.
*H04W 56/00* (2009.01)
*H04J 11/00* (2006.01)
*H04L 5/00* (2006.01)

(52) U.S. Cl.
CPC ....... *H04W 56/001* (2013.01); *H04J 11/0069* (2013.01); *H04J 11/0083* (2013.01); *H04L 5/0048* (2013.01)

(58) Field of Classification Search
CPC ..... H04L 5/0048; H04L 5/001; H04L 5/0053; H04W 48/16
See application file for complete search history.

(56) References Cited

U.S. PATENT DOCUMENTS 8,781,034 B2* 7/2014 Pu ................ H04L 27/2649
375/260
2010/0020674 A1 1/2010 Choi et al.
(Continued)

FOREIGN PATENT DOCUMENTS

CN 101998477 A 3/2011
CN 103441778 A 12/2013
(Continued)

OTHER PUBLICATIONS

European Search Report dated Sep. 19, 2018, issued in European Application No. 16842259.0-1220 / 3346623.
(Continued)

*Primary Examiner* — Chandrahas B Patel
(74) *Attorney, Agent, or Firm* — Jefferson IP Law, LLP (57) ABSTRACT

Provided are a cell ID determination method and apparatus for a receiving device in a wireless communication system. The cell ID determination method for a receiving device may include: receiving a first synchronization signal and a second synchronization signal; generating a first joint signal by concatenating the first synchronization signal and the second synchronization signal; calculating the correlation between the first joint signal and each of a preset number of cell IDs; and determining a cell ID using the calculated correlations.

14 Claims, 10 Drawing Sheets

(56) References Cited

U.S. PATENT DOCUMENTS

| | | |
|---|---|---|
| 2010/0048217 A1 | 2/2010 | Deshpande et al. |
| 2010/0260168 A1 | 10/2010 | Gheorghiu et al. |
| 2010/0311346 A1 | 12/2010 | Lindoff et al. |
| 2012/0046056 A1 | 2/2012 | Luo et al. |
| 2012/0052869 A1 | 3/2012 | Lindoff et al. |
| 2012/0100880 A1 | 4/2012 | Baek et al. |
| 2012/0196647 A1 | 8/2012 | Chen et al. |
| 2012/0231790 A1 | 9/2012 | Lindoff et al. |
| 2014/0037028 A1 | 2/2014 | Shin et al. |
| 2014/0133607 A1 | 5/2014 | Pu et al. |
| 2014/0293954 A1 | 10/2014 | Horvat et al. |
| 2015/0029877 A1 | 1/2015 | Chen et al. |
| 2015/0071103 A1 | 3/2015 | Xu et al. |
| 2016/0192332 A1 | 6/2016 | Koorapaty et al. |
| 2016/0278031 A1 | 9/2016 | Sorrentino |

FOREIGN PATENT DOCUMENTS

| | | |
|---|---|---|
| CN | 103813362 A | 5/2014 |
| KR | 10-2010-0011493 A | 2/2010 |
| KR | 10-2012-0042138 A | 5/2012 |
| WO | 2015/114566 A8 | 8/2015 |
| WO | 2015/115977 A1 | 8/2015 |

OTHER PUBLICATIONS

Corrected Version of International Application dated Aug. 6, 2015, issued in International Publication No. WO 2015/114566 A8.

NTT DOCOMO: "Views on discovery signal design for Rel. 12 discovery procedure", 3GPP Draft; R1-141466 Views on Discovery Signal Design, 3rd Generation Partnership Project (3GPP), Mobile Competence Centre; 650, Route Des Lucioles ; F-06921 Sophia-Antipolis Cedex ; France, vol. RAN WG1, No. Shenzhen, China; Mar. 31, 2014-Apr. 4, 2014 Mar. 22, 2014 (Mar. 22, 2014), XP050813893, Retrieved from the Internet: URL.

Chinese Office Action dated Dec. 14, 2018; Application or Patent #: 201680050877.9; Issuing #: 2018121101961680.

European Search Report dated Feb. 19, 2019; Reference: P18910WOEP; Application #/Patent #: 16842259.0-1220/ 3346623 PCT/KR2016009680.

\* cited by examiner

CELL ID DETERMINATION METHOD AND DEVICE IN WIRELESS COMMUNICATION SYSTEM

TECHNICAL FIELD

The present invention relates to a wireless communication system, and more particularly, to a method and apparatus for determining the cell ID for achieving high processing gain.

BACKGROUND ART

Mobile communication systems have been generally developed to provide voice services while guaranteeing user mobility. Such mobile communication systems have gradually expanded their coverage from voice services through data services up to high-speed data services. However, as current mobile communication systems suffer resource shortages and users demand even higher-speed services, development of more advanced mobile communication systems is needed.

To meet this demand, the 3rd Generation Partnership Project (3GPP) has been working to standardize specifications for the Long Term Evolution (LTE) system as a next generation mobile communication system. The LTE system aims to realize high-speed packet based communication supporting a data rate of about 100 Mbps.

To this end, the LTE system employs orthogonal frequency division multiplexing (OFDM), which requires a high level of synchronization between the transmitting device and the receiving device.

Hence, there is a need to develop a method and apparatus for synchronization acquisition and cell ID determination while achieving high processing gain.

DISCLOSURE OF INVENTION

Technical Problem

The present invention has been made in view of the above problem. Accordingly, an aspect of the present invention is to provide a method and apparatus that can determine the cell ID using at least one of a received synchronization signal and a received cell specific reference signal.

Solution to Problem

In accordance with an aspect of the present invention, there is provided a method of cell ID determination for a receiving device. The method may include: receiving a first synchronization signal and a second synchronization signal; generating a first joint signal by concatenating the first synchronization signal and the second synchronization signal; calculating the correlation between the first joint signal and each of a preset number of cell IDs; and determining a cell ID using the calculated correlations.

The first synchronization signal may be a primary synchronization signal (PSS), and the second synchronization signal may be a secondary synchronization signal (SSS).

In accordance with another aspect of the present invention, there is provided a method of cell ID determination for a receiving device. The method may include: identifying the position at which a cell-specific reference signal (CRS) is transmitted in at least one received subframe; generating a second joint signal by concatenating CRS symbols received at the identified positions for CRS transmission; calculating the correlation between the second joint signal and each of a preset number of cell IDs; and determining a cell ID using the calculated correlations.

The position at which a CRS is transmitted may be a specific resource element (RE).

In accordance with another aspect of the present invention, there is provided a method of cell ID determination for a receiving device. The method may include: identifying a parameter for at least one of the band class and the bandwidth of a frequency; and determining a cell ID by applying, according to the identified parameter, one of a synchronization signal based determination scheme that uses a first joint signal obtained by concatenating a first synchronization signal and a second synchronization signal for cell ID determination, and a CRS-based determination scheme that uses a second joint signal obtained by concatenating CRS symbols for cell ID determination.

Determining a cell ID by applying the synchronization signal based determination scheme may include: receiving the first synchronization signal and the second synchronization signal; generating the first joint signal by concatenating the first synchronization signal and the second synchronization signal; calculating the correlation between the first joint signal and each of a preset number of cell IDs; and determining the cell ID using the calculated correlations.

Determining a cell ID by applying the CRS-based determination scheme may include: identifying the position at which a cell-specific reference signal (CRS) is transmitted in at least one received subframe; generating the second joint signal by concatenating CRS symbols received at the identified positions for CRS transmission; calculating the correlation between the second joint signal and each of a preset number of cell IDs; and determining the cell ID using the calculated correlations.

In accordance with another aspect of the present invention, there is provided a receiving device. The receiving device may include: a transceiver unit configured to receive a first synchronization signal and a second synchronization signal; and a controller configured to generate a first joint signal by concatenating the first synchronization signal and the second synchronization signal, calculate the correlation between the first joint signal and each of a preset number of cell IDs, and determine a cell ID using the calculated correlations.

The first synchronization signal may be a primary synchronization signal (PSS), and the second synchronization signal may be a secondary synchronization signal (SSS).

In accordance with another aspect of the present invention, there is provided a receiving device. The receiving device may include: a transceiver unit configured to transmit and receive a signal; and a controller configured to identify the position at which a cell-specific reference signal (CRS) is transmitted in at least one subframe received through the transceiver unit, generate a second joint signal by concatenating CRS symbols received at the identified positions for CRS transmission, calculate the correlation between the second joint signal and each of a preset number of cell IDs, and determine a cell ID using the calculated correlations.

The position at which a CRS is transmitted may be a specific resource element (RE).

In accordance with another aspect of the present invention, there is provided a receiving device. The receiving device may include: a transceiver unit configured to transmit and receive a signal; and a controller configured to identify a parameter for at least one of the band class and the bandwidth of a frequency, and determine a cell ID by applying, according to the identified parameter, one of a synchronization signal based determination scheme that uses a first joint signal obtained by concatenating a first synchronization signal and a second synchronization signal for cell ID determination, and a CRS-based determination scheme that uses a second joint signal obtained by concatenating CRS symbols for cell ID determination.

For determining a cell ID by applying the synchronization signal based determination scheme, the controller may be configured to receive the first synchronization signal and the second synchronization signal, generate the first joint signal by concatenating the first synchronization signal and the second synchronization signal, calculate the correlation between the first joint signal and each of a preset number of cell IDs, and determine the cell ID using the calculated correlations.

For determining a cell ID by applying the CRS-based determination scheme, the controller may be configured to identify the position at which a cell-specific reference signal (CRS) is transmitted in at least one received subframe, generate the second joint signal by concatenating CRS symbols received at the identified positions for CRS transmission, calculate the correlation between the second joint signal and each of a preset number of cell IDs, and determine the cell ID using the calculated correlations.

Advantageous Effects of Invention

In a feature of the present invention, the receiving device can effectively determine the cell ID while obtaining high processing gain by using at least one of a received synchronization signal and a received cell specific reference signal.

MODE FOR THE INVENTION

Hereinafter, embodiments of the present invention are described in detail with reference to the accompanying drawings. The same or similar reference symbols are used throughout the drawings to refer to the same or like parts. Detailed descriptions of well-known functions and structures incorporated herein may be omitted to avoid obscuring the subject matter of the present invention.

The following description is focused on Advanced E-UTRA (LTE-A) systems supporting carrier aggregation. However, it should be understood by those skilled in the art that the subject matter of the present invention is applicable to other communication systems having similar technical backgrounds and channel configurations without significant modifications departing from the scope of the present invention. For example, the subject matter of the present invention can be applied to the multicarrier HSPA system supporting carrier aggregation.

Descriptions of technical details well known in the art and not directly related to the present invention may also be omitted for clarity and conciseness without obscuring the subject matter of the present invention.

In the drawings, some elements are exaggerated, omitted, or only outlined in brief, and thus may be not drawn to scale. The same or similar reference symbols are used throughout the drawings to refer to the same or like parts.

The aspects, features and advantages of the present invention will be more apparent from the following detailed description taken in conjunction with the accompanying drawings. The description of the various embodiments is to be construed as exemplary only and does not describe every possible instance of the present invention. It should be apparent to those skilled in the art that the following description of various embodiments of the present invention is provided for illustration purpose only and not for the purpose of limiting the present invention as defined by the appended claims and their equivalents. The same reference symbols are used throughout the description to refer to the same parts.

Meanwhile, it is known to those skilled in the art that blocks of a flowchart (or sequence diagram) and a combination of flowcharts may be represented and executed by computer program instructions. These computer program instructions may be loaded on a processor of a general purpose computer, special purpose computer or programmable data processing equipment. When the loaded program instructions are executed by the processor, they create a means for carrying out functions described in the flowchart. As the computer program instructions may be stored in a computer readable memory that is usable in a specialized computer or a programmable data processing equipment, it is also possible to create articles of manufacture that carry out functions described in the flowchart. As the computer program instructions may be loaded on a computer or a programmable data processing equipment, when executed as processes, they may carry out steps of functions described in the flowchart.

A block of a flowchart may correspond to a module, a segment or a code containing one or more executable instructions implementing one or more logical functions, or to a part thereof. In some cases, functions described by blocks may be executed in an order different from the listed order. For example, two blocks listed in sequence may be executed at the same time or executed in reverse order.

In the description, the word "unit", "module" or the like may refer to a software component or hardware component such as an FPGA or ASIC capable of carrying out a function or an operation. However, "unit" or the like is not limited to hardware or software. A unit or the like may be configured so as to reside in an addressable storage medium or to drive one or more processors. Units or the like may refer to software components, object-oriented software components, class components, task components, processes, functions, attributes, procedures, subroutines, program code segments, drivers, firmware, microcode, circuits, data, databases, data structures, tables, arrays or variables. A function provided by a component and unit may be a combination of smaller components and units, and may be combined with others to compose large components and units. Components and units may be configured to drive a device or one or more processors in a secure multimedia card.

Figure 1:
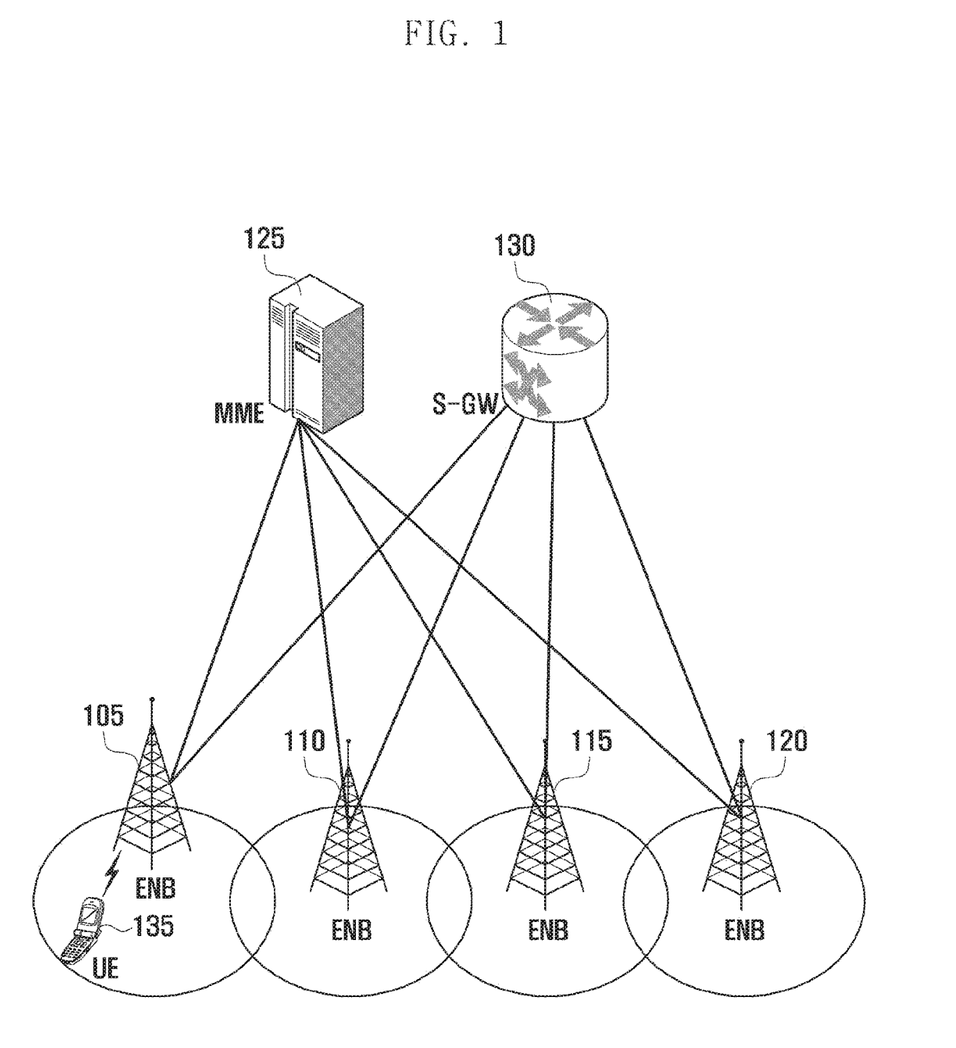
FIG. 1 illustrates the architecture of a wireless communication system according to an embodiment of the present invention.

FIG. 1 illustrates the architecture of a wireless communication system according to an embodiment of the present invention. The wireless communication system of FIG. 1 may be, for example, the LTE system.

With reference to FIG. 1, the radio access network of the LTE system is composed of base stations (evolved Node Bs, ENBs) 105, 110, 115 and 120, a mobility management entity (MME) 125, and a serving-gateway (S-GW) 130. A user equipment (UE or terminal) 135 may connect to an external network through the ENBs 105 to 120 and the S-GW 130.

In FIG. 1, the ENBs 105 to 120 correspond to Node Bs of the universal mobile telecommunications system (UMTS), but perform more complex functions in comparison to existing Node Bs. The ENBs 105 to 120 may be connected to the UE 135 through wireless channels. In the LTE system, all user traffic including real-time services like VoIP (Voice over IP) services is served by shared channels. Hence, it is necessary to perform scheduling on the basis of collected status information regarding buffers, available transmit powers and channels of UEs. Each of the ENBs 105 to 120 performs this scheduling function. One ENB 105, 110, 115 or 120 may control multiple cells. To achieve a data rate of 100 Mbps in a 20 MHz bandwidth, the LTE system utilizes orthogonal frequency division multiplexing (OFDM) as radio access technology. The LTE system employs adaptive modulation and coding (AMC) to determine the modulation scheme and channel coding rate according to channel states of UEs. The S-GW 130 may provide data bearers, and may create and remove data bearers under the control of the MME 125. The MME 125 is connected to multiple ENBs 105 to 120 and performs various control functions including mobility management for UEs.

Figure 2:
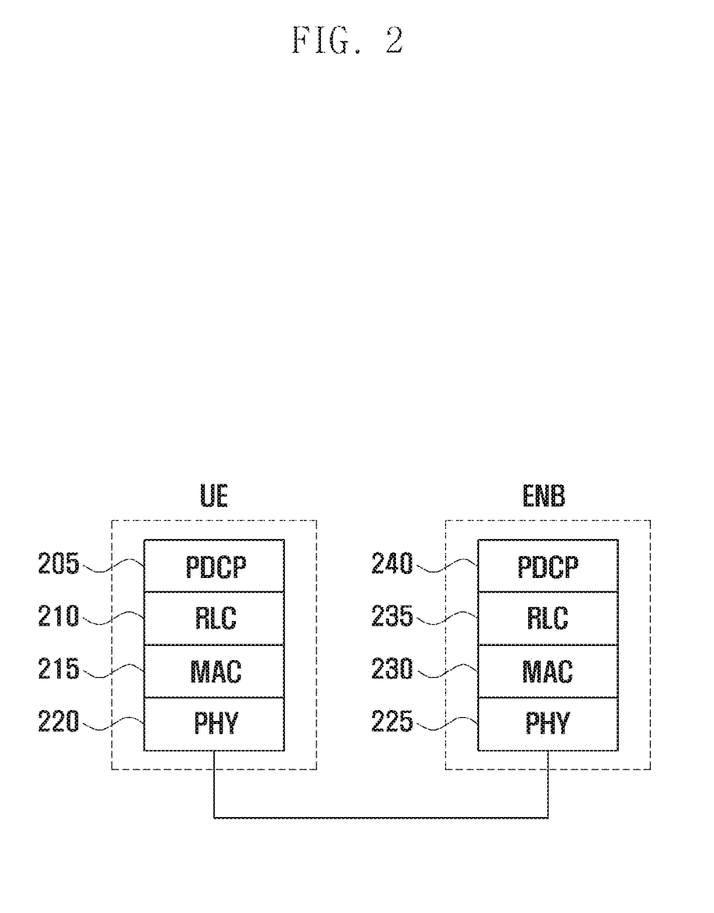
FIG. 2 illustrates a hierarchy of wireless protocols in the LTE system according to an embodiment of the present invention.

FIG. 2 illustrates a hierarchy of wireless protocols in the LTE system according to an embodiment of the present invention.

With reference to FIG. 2, in the LTE system, a UE and an ENB each include a wireless protocol stack composed of PDCP (Packet Data Convergence Protocol) 205 or 240, RLC (Radio Link Control) 210 or 235, and MAC (Medium Access Control) 215 or 230. The PDCP 205 or 240 performs compression and decompression of IP headers. The RLC 210 or 235 reconfigures PDCP PDUs (Protocol Data Unit) to a suitable size and performs ARQ operation. The MAC 215 or 230 is connected with multiple RLC layer entities in a UE. The MAC 215 or 230 multiplexes RLC PDUs into MAC PDUs and demultiplexes MAC PDUs into RLC PDUs. The physical (PHY) layer 220 or 225 converts higher layer data into OFDM symbols by means of channel coding and modulation and transmits the OFDM symbols through a wireless channel. The PHY layer 220 or 225 converts OFDM symbols received through a wireless channel into higher layer data by means of demodulation and channel decoding and forwards the data to higher layers.

Next, a description is given of a method for detecting the cell ID of a signal received by the receiving device in the above-described LTE system.

Figure 3:
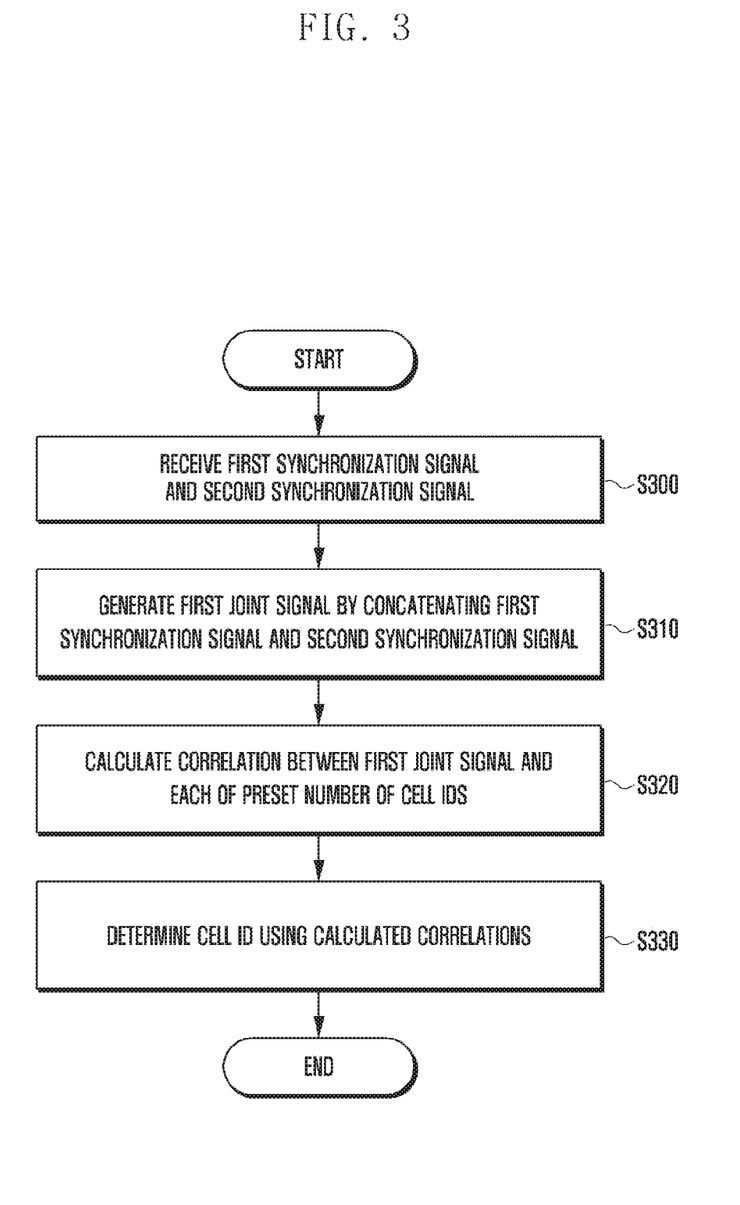
FIG. 3 is a flowchart of a method for determining the cell ID using a first synchronization signal and a second synchronization signal according to an embodiment of the present invention.

FIG. 3 is a flowchart of a method for determining the cell ID using the primary synchronization signal (PSS) and the secondary synchronization signal (SSS) according to an embodiment of the present invention.

At step S300, the receiving device may receive a first synchronization signal and a second synchronization signal. In one embodiment, the receiving device may be a user equipment or terminal. However, in another embodiment, the receiving device may be a small cell base station for small cells such as a picocell and a femtocell.

The first synchronization signal may be a primary synchronization signal (PSS), and the second synchronization signal may be a secondary synchronization signal (SSS).

At step S310, the receiving device may generate a first joint signal by concatenating the received first synchronization signal and second synchronization signal.

For example, assume that the first synchronization signal and the second synchronization signal are received at different times. The receiving device may store a synchronization signal received first in the memory and may generate a first joint signal by concatenating a newly received synchronization signal with the stored synchronization signal.

For example, the receiving device may concatenate the PSS and the SSS each having a sequence length of 62 subcarriers to generate the first joint signal having a length of 124 subcarriers. Here, the first joint signal may be referred to as SPS signal.

At step S320, the receiving device may calculate the correlation between the first joint signal and each of a preset number of cell IDs.

At step S330, the receiving device may determine the cell ID using the calculated correlations. For example, the receiving device may identify a cell ID having the maximum value among the calculated correlations.

Figure 4A:
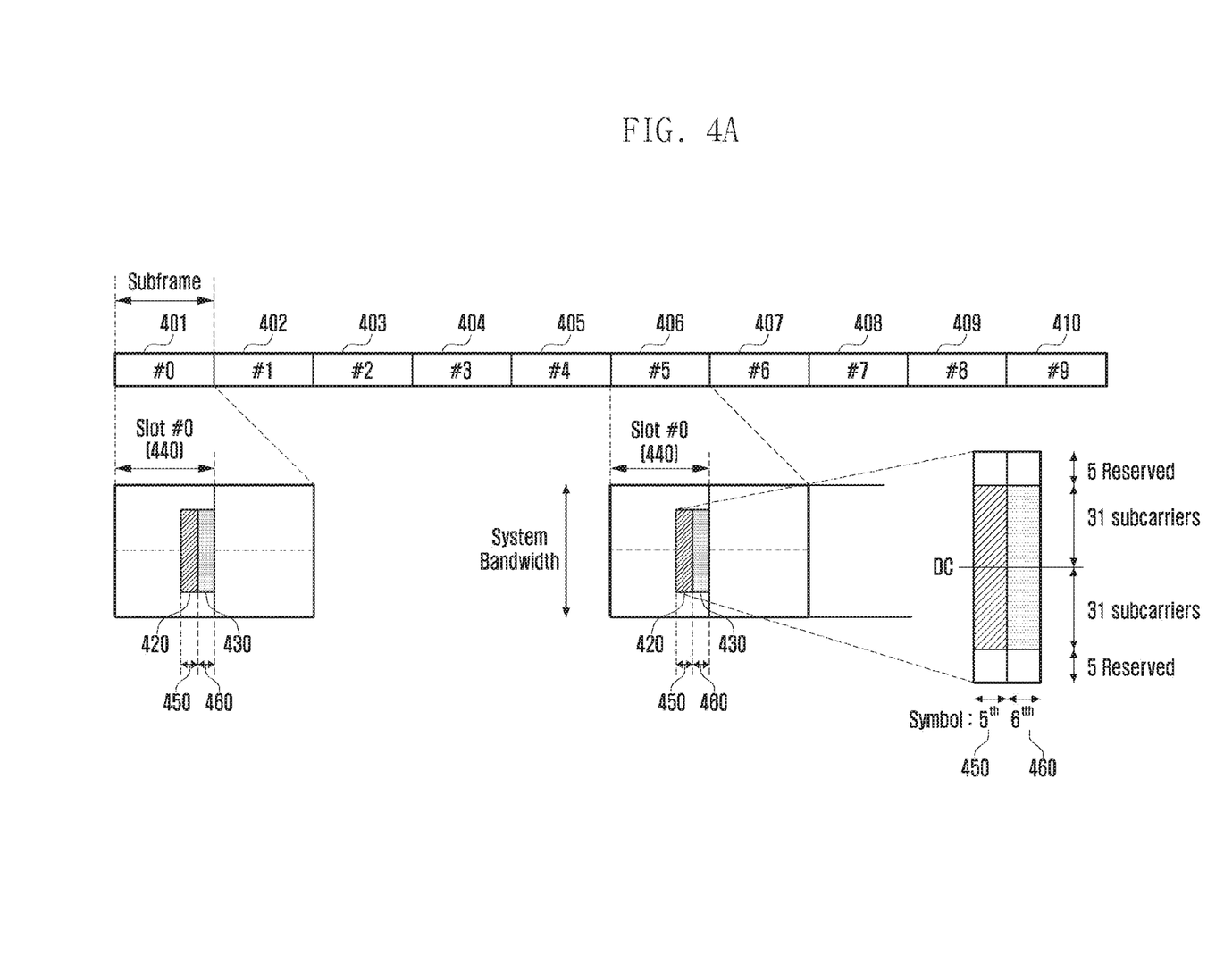
FIGS. 4A and 4B depict structures in which a primary synchronization signal (PSS) and a secondary synchronization signal (SSS) are received according to an embodiment of the present invention.
Figure 4B:
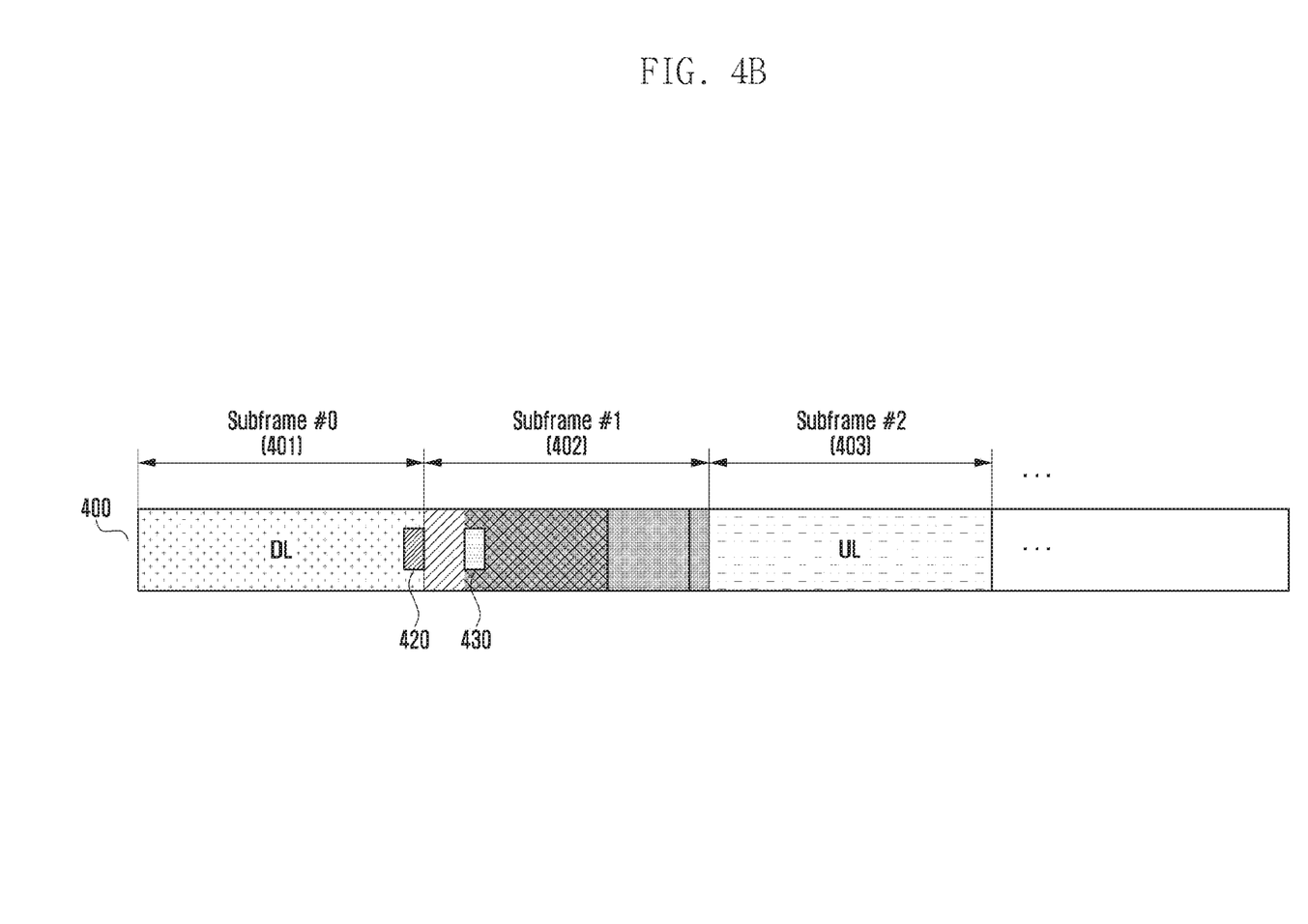

Next, when the first synchronization signal is the PSS and the second synchronization signal is the SSS, a detailed description is given of a method for detecting the cell ID using a combined SPS signal obtained by concatenating the PSS and the SSS with reference to FIGS. 4A and 4B.

FIG. 4A depicts a structure in which the PSS and the SSS are received in LTE FDD mode. As shown in FIG. 4A, one radio frame 400 includes ten subframes 401 to 410. In the radio frame 400, the SSS 420 and the PSS 430 are received through subframe #0 (401) and subframe #5 (406). Specifically, the SSS 420 and the PSS 430 are received through the first slot of each of subframe #0 (401) and subframe #5 (406).

For example, when the extended cyclic prefix is used in LTE FDD mode, each of the subframes 401 to 410 includes 12 symbols. Here, the SSS 420 is received through the fifth symbol 450 of each of subframe #0 (401) and subframe #5 (406), and the PSS 430 is received through the sixth symbol 460 of each of subframe #0 (401) and subframe #5 (406).

The receiving device may store the received SSS 420 in the memory and then concatenate the received PSS 430 with the stored SSS 420 to generate a first joint signal (SPS).

FIG. 4B depicts a structure in which the PSS and the SSS are received in LTE TDD mode. As shown in FIG. 4B, the SSS 420 is received through the last symbol of subframe #0 (401). Although not shown in FIG. 4B, the SSS 420 is also received through the last symbol of subframe #5.

The PSS 430 is received through the third symbol of subframe #1. Although not shown in FIG. 4B, the PSS 430 is also received through the third symbol of subframe #6.

Also in LTE TDD mode, the receiving device may store the received SSS 420 in the memory and then concatenate the received PSS 430 with the stored SSS 420 to generate a first joint signal (SPS).

After generating the first joint signal as described above, the receiving device calculates the correlation between the first joint signal and each of a preset number of cell IDs. For example, the receiving device may calculate the correlation between the first joint signal and each of 504 cell IDs. The receiving device may identify the cell ID having the maximum value among the calculated correlations.

The above method for detecting the cell ID using the first joint signal enables the receiving device to efficiently detect the cell ID even when information on the frequency bandwidth in which the signal is received is insufficient or an unlicensed band is used.

Figure 5:
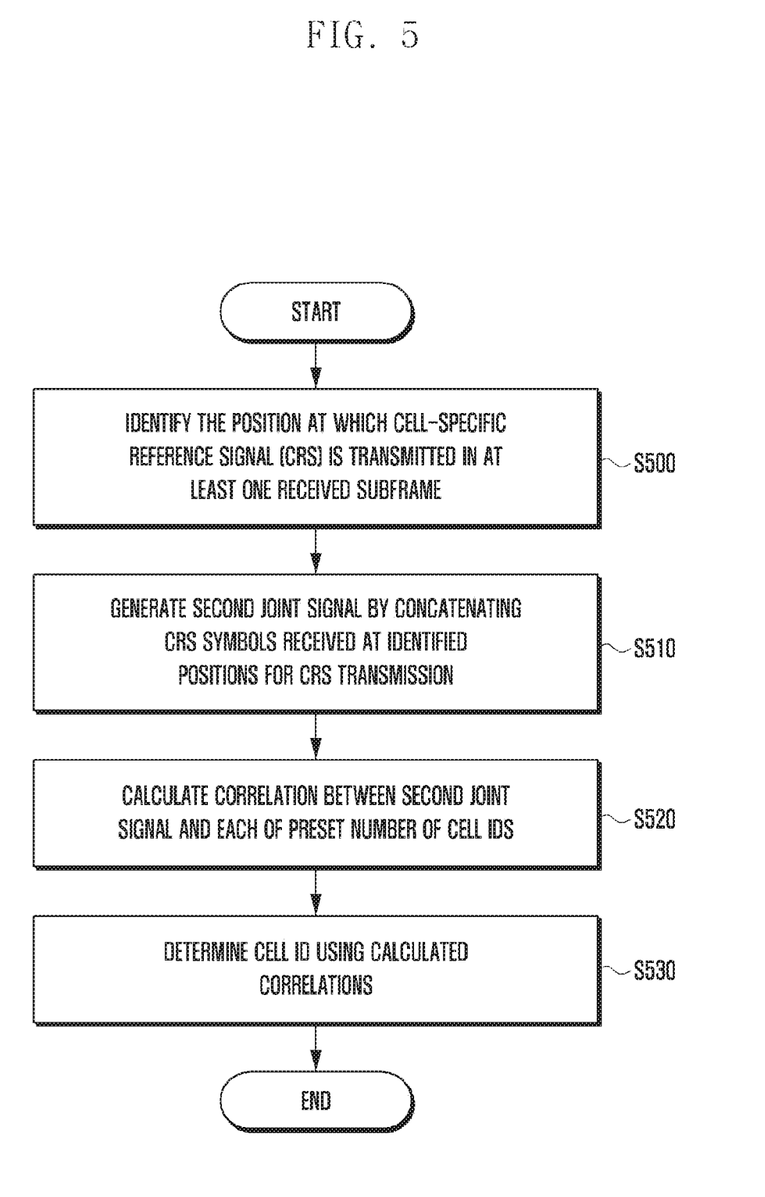
FIG. 5 is a flowchart of a method for determining the cell ID using a cell specific reference signal (CRS) according to an embodiment of the present invention.

FIG. 5 is a flowchart of a method for determining the cell ID using a cell specific reference signal (CRS) according to an embodiment of the present invention.

At step S500, the receiving device may identify the position at which the cell-specific reference signal (CRS) is transmitted in at least one subframe. For example, the receiving device may identify the resource element (RE) at which the CRS is transmitted.

Figure 6:
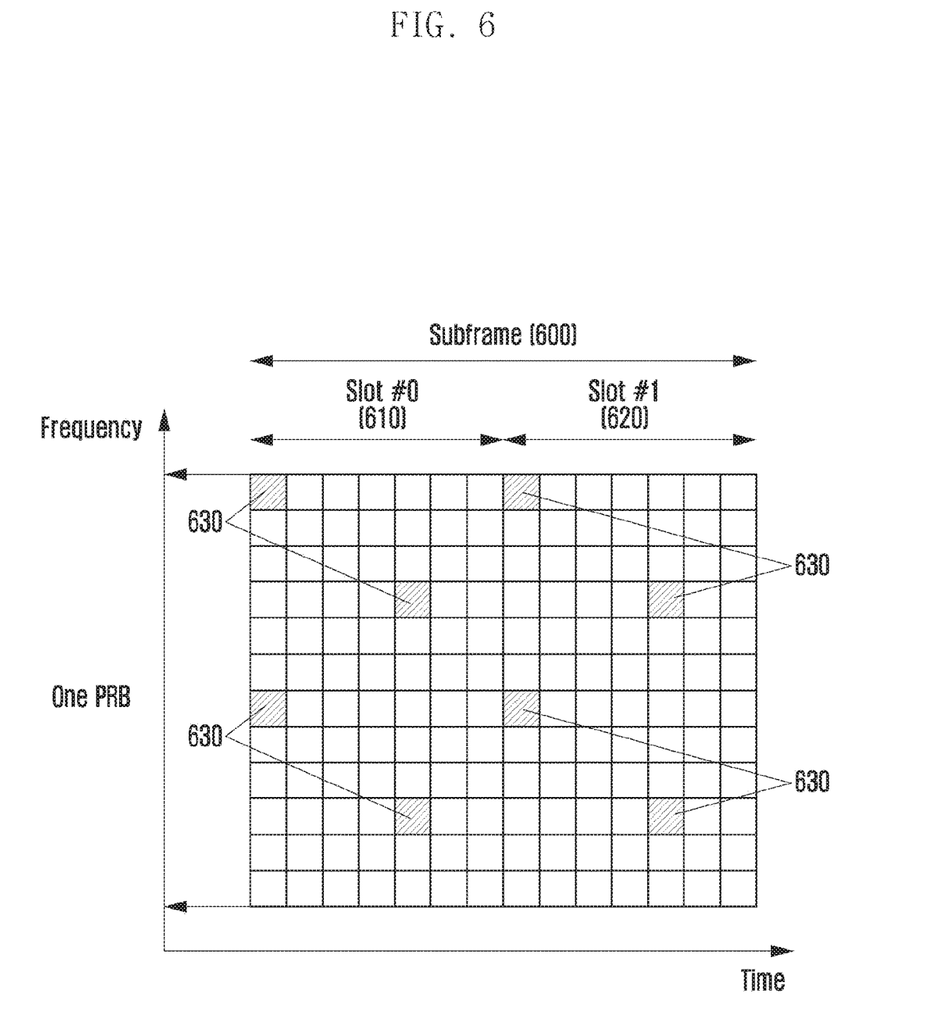
FIG. 6 depicts a structure in which the CRS is received according to an embodiment of the present invention.

The CRS may be received at positions shown in FIG. 6. For example, the receiving device can receive the CRS 630 through the first symbol and the fifth symbol of each of slot #0 (610) and slot #1 (620) in one subframe 600.

With reference back to FIG. 5, at step S510, the receiving device may concatenate the CRS symbols received at the identified positions for CRS transmission to generate a second joint signal.

At step S520, the receiving device may calculate the correlation between the second joint signal and each of a preset number of cell IDs. At step S530, the receiving device may determine the cell ID using the calculated correlations.

The method for determining the cell ID using the CRS described above can be efficiently used when the receiving device is aware of the band-class information for a particular operator or when the frequency bandwidth in which the signal is received is wide.

Figure 7:
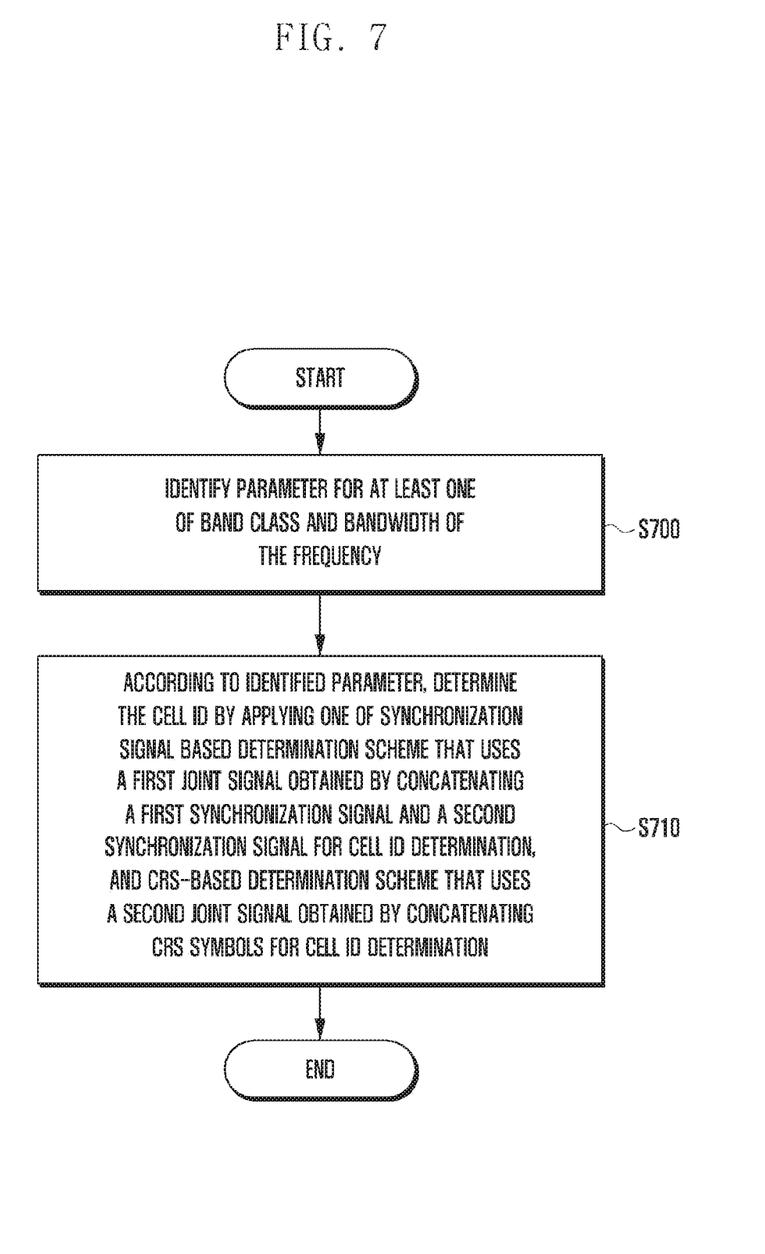
FIG. 7 is a flowchart of a method for determining the cell ID using the PSS/SSS or CRS according to an embodiment of the present invention.

FIG. 7 is a flowchart of a method for determining the cell ID using the PSS/SSS or CRS according to another embodiment of the present invention.

At step S700, the receiving device may identify a parameter for at least one of the band class and the bandwidth of the frequency.

At step S710, according to the identified parameter, the receiving device may determine the cell ID by applying one of the synchronization signal based determination scheme that uses a first joint signal obtained by concatenating a first synchronization signal and a second synchronization signal for cell ID determination, and the CRS-based determination scheme that uses a second joint signal obtained by concatenating CRS symbols for cell ID determination.

Figure 8:
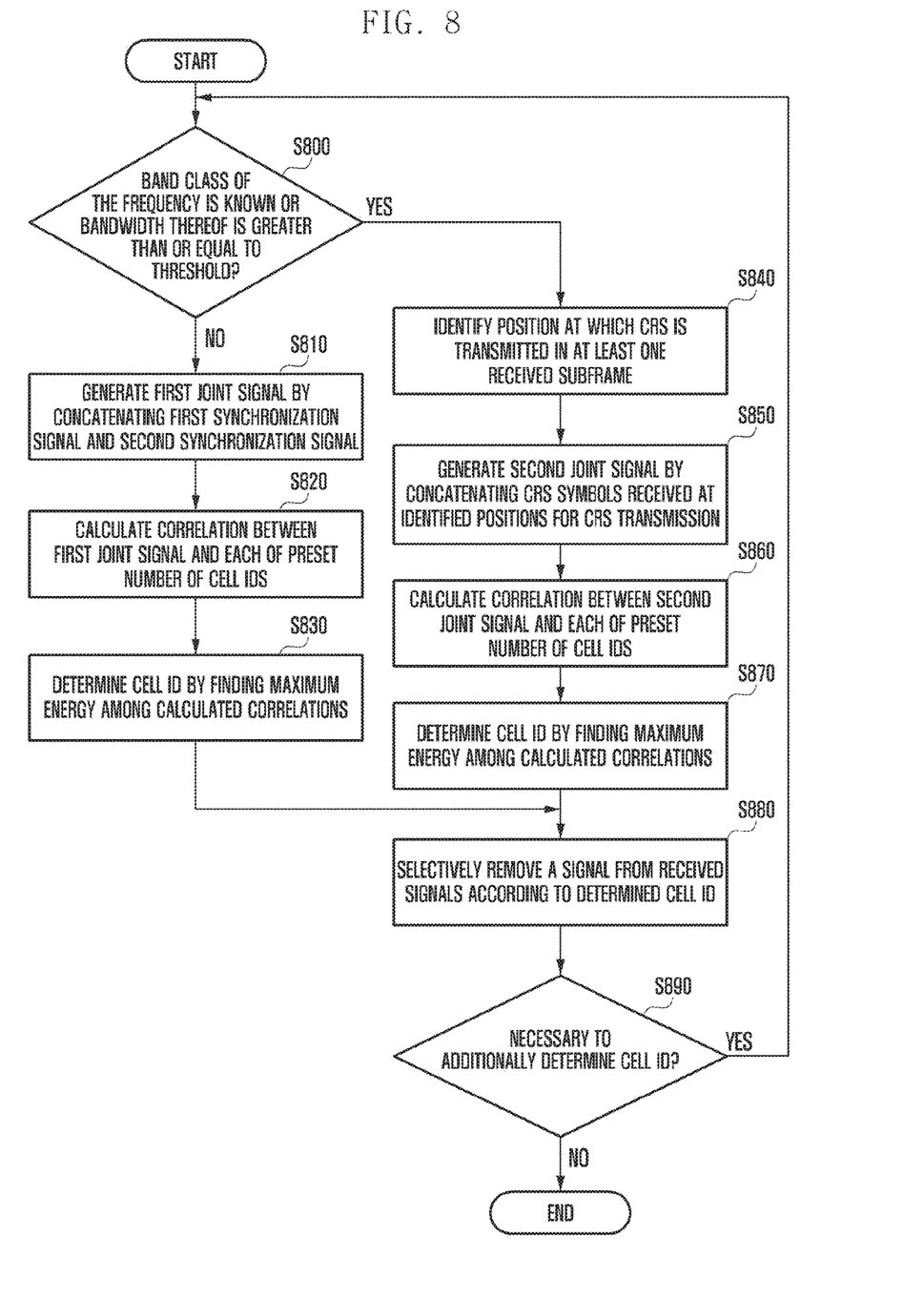
FIG. 8 is a detailed flowchart of the method for determining the cell ID using the PSS/SSS or CRS according to an embodiment of the present invention.

Next, a detailed description is given of the method for determining the cell ID using the PSS/SSS or the CRS with reference to FIG. 8.

At step S800, the receiving device may determine whether the band class of the frequency at which the signal is received is known or the bandwidth of the frequency is greater than or equal to a threshold.

Upon determining that the band class of the frequency at which the signal is received is not known and the bandwidth of the frequency is less than the threshold, the procedure proceeds to step S810.

At step S810, the receiving device may generate a first joint signal by concatenating the first synchronization signal and the second synchronization signal. At step S820, the receiving device may calculate the correlation between the first joint signal and each of a preset number of cell IDs.

For example, in one embodiment, when the first synchronization signal is the PSS, and the second synchronization signal is the SSS, the receiving device may concatenate the PSS and the SSS each having a sequence length of 62 subcarriers to generate the first joint signal (SPS signal) having a length of 124 subcarriers.

Specifically, it is assumed that the received signal corresponding to the $k^{th}$ PSS is $y_{PSS}(k)$ and the received signal corresponding to the $k^{th}$ SSS is $y_{SSS}(k)$. The receiving device may store the received signal $y_{PSS}(k)$ first and then concatenate the received signal $y_{SSS}(k)$ with the stored signal $y_{PSS}(k)$.

The new joint signal obtained through concatenation may be denoted by $y_{SSS}(\tilde{k})$.

As the lengths of $y_{PSS}(k)$ and $y_{SSS}(k)$ correspond respectively to 62 subcarriers, the length of the joint signal $y_{SSS}(\hat{k})$ corresponds to 124 subcarriers.

In this way, it is possible to generate 504 joint signals each having a length of 124, and the 504 joint signals may be denoted by SPS($\hat{k}$). Based on the signal model described above, the receiving apparatus can construct a signal reception algorithm as shown in Equation 1 below.

$$\widehat{SPS} = \mathrm{argmax}_i \left( \left| \sum_{k=0}^{123} y_{SPS}(k) * SPS_i^*(k) \right|^2 \right), \quad \text{[Equation 1]}$$

$(i = 0, 1, 2, \ldots, 503)$

At step S830, the receiving device may determine the cell ID by finding the maximum energy among the calculated correlations. For example, the receiving device can determine the cell ID with the largest processing gain by using Equation 1.

Upon determining that the band class of the frequency at which the signal is received is known or the bandwidth of the frequency is greater than or equal to the threshold at step S800, the procedure proceeds to step S840 at which the receiving device may identify the position at which the CRS is transmitted in at least one subframe. At step S850, the receiving device may concatenate the CRS symbols received at the identified positions for CRS transmission to generate a second joint signal.

At step S860, the receiving device may calculate the correlation between the second joint signal and each of a preset number of cell IDs. At step S870, the receiving device may determine the cell ID by finding the maximum energy among the calculated correlations.

As described with reference to FIG. 6, according to the LTE standard, the CRS has at least eight QPRS sequences in the resource block (RB) and is spread throughout the frequency band.

Hence, for LTE bandwidths 1.4 MHz, 3 MHz, 5 MHz, 10 MHz, 15 MHz, and 20 MHz, there may be 48, 120, 200, 400, 600, and 800 CRS sequences in one subframe, respectively. For bandwidths 1.4 MHz, 3 MHz, 5 MHz, 10 MHz, 15 MHz, and 20 MHz, there may be 240, 600, 1000, 2000, 3000, and 4000 CRS sequences within 5 ms (PSS/SSS reception period), respectively.

Compared with the PSS/SSS in terms of sequence density during the same period, for the smallest bandwidth 1.4 MHz, as the number of CRS sequences is 3.87 (=240/62) times larger, a gain of 5.9 dB can be expected.

According to the LTE standard, the CRS has a different symbol mapping structure depending on the use of the normal cyclic prefix or the extended cyclic prefix, and the mapping position thereof in subcarriers varies depending on the cell ID.

In addition, the CRS sequences can be generated by a Gold sequence generator with a specific seed. The generated CRS sequences can be mapped to resource elements (REs). The seed used at this time may be represented by Equation 2 below.

$$c_{init}(2^{10}(7(n_s+1)+l+1)(2N_{ID}^{cell}+1)+2N_{ID}^{cell}+N_{CP}$$ [Equation 2]

In Equation 2, $n_s$ indicates the slot number, Z indicates the symbol tell number, $N_{ID}^{cell}$ indicates the cell ID, and $N_{CP}$ indicates the CP type (e.g. 1 for normal CP and 0 for extended CP). Hence, the CRS sequence is determined according to the cell ID.

When the symbol boundary is detected using the PSS, the position of the CRS in one of subframe #0 or subframe #4 can be known by the correlation with the PSS position. By finding the PSS, NID2 (0, 1, 2), which is one of the configuration information of the cell ID, can be found. Thus, 504 hypotheses can be reduced to 168 hypotheses.

As a result, the receiving device can construct a non-coherent receiver by comparing 336 hypotheses within 5 ms. The received signal corresponding to the CRS subcarrier is represented by Equation 3.

$$y=hr+n$$ [Equation 3]

In Equation 3, r indicates a specific CRS sequence, h denotes the propagation channel, and n denotes additive white Gaussian noise (AWGN).

According to Equation 4 below, the receiving device may compare all hypotheses for 366 CRS sequences and implement a non-coherent cell ID detection receiver.

$$\hat{i}=\mathrm{argmax}_i(|\Sigma_{k=0}^{N_{CRS}-1}y(k)*r_i^*(k)|^2)$$ [Equation 4]

(i=0, 1, 2, . . . , 335)

In Equation 4, $N_{CRS}$ denotes the number of CRS sequences that can be included within 5 ms and may be equal to the number of CRSs depending on the bandwidth as described above (e.g. for bandwidths 1.4 MHz, 3 MHz, 5 MHz, 10 MHz, 15 MHz, and 20 MHz, there may be 240, 600, 1000, 2000, 3000, and 4000 CRS sequences within 5 ms, respectively).

If the same CRS hypothesis as the specific CRS is substituted into Equation 4, it is possible to obtain Equation 5 below.

$$z = \left| \sum_{k=0}^{N_{CRS}-1} y(k)*r^*(k) \right|^2$$

$$= \left| \sum_{k=0}^{N_{CRS}-1} (h(k)+n(k)*r^*(k)) \right|^2$$

$$= \left| \sum_{k=0}^{N_{CRS}-1} (h(k)+\tilde{n}(k)) \right|^2$$

[Equation 5]

In Equation 5, h(k) is a channel response due to channel fading and has a constant value within a specific coherent time and coherent bandwidth according to fading characteristics. In the outside of the range of coherent time and coherent bandwidth, the channel phase changes over a specific value, causing performance degradation.

Hence, if the number of CRS sequences within the coherent time/bandwidth among the $N_{CRS}$ CRS sequences is denoted by $M_{CRS}$, the receiving device can implement a receiver as shown in Equation 6 by dividing $N_{CRS}=(LM_{CRS})$ into L segments and accumulating them in units of $M_{CRS}$.

$$\hat{i}=\mathrm{argmax}_i(\Sigma_L|\Sigma_{k=0}^{N_{CRS}-1}y(k)*r_i^*(k)|^2)$$ [Equation 6]

(i=0, 1, 2, . . . , 335)

The receiving device can reduce the effect on channel selectivity by applying vector summation in units of $M_{CRS}$ and energy summation in L segments. Various algorithms can be used to determine the number of coherent CRSs $M_{CRS}$. For example, the receiving device may use a scheme of averaging phase differences between CRS tones.

Meanwhile, at step S880, the receiving device may selectively remove a signal from the received signals according to the determined cell ID. For example, when the receiving apparatus has determined cell ID #0 among the preset number of cell IDs by using the above-described method, it may remove the signal received from the base station with cell ID #0 from the received signals.

The receiving apparatus can improve the performance of detecting another cell ID by removing the signal related to the cell ID with strong power at step S880.

At step S890, the receiving device may determine whether it is necessary to additionally determine the cell ID after selective signal cancellation at step S880. Upon determining that it is necessary to additionally determine the cell ID, the procedure returns to step S810 at which the receiving device may check the band class or bandwidth of the frequency.

Figure 9:
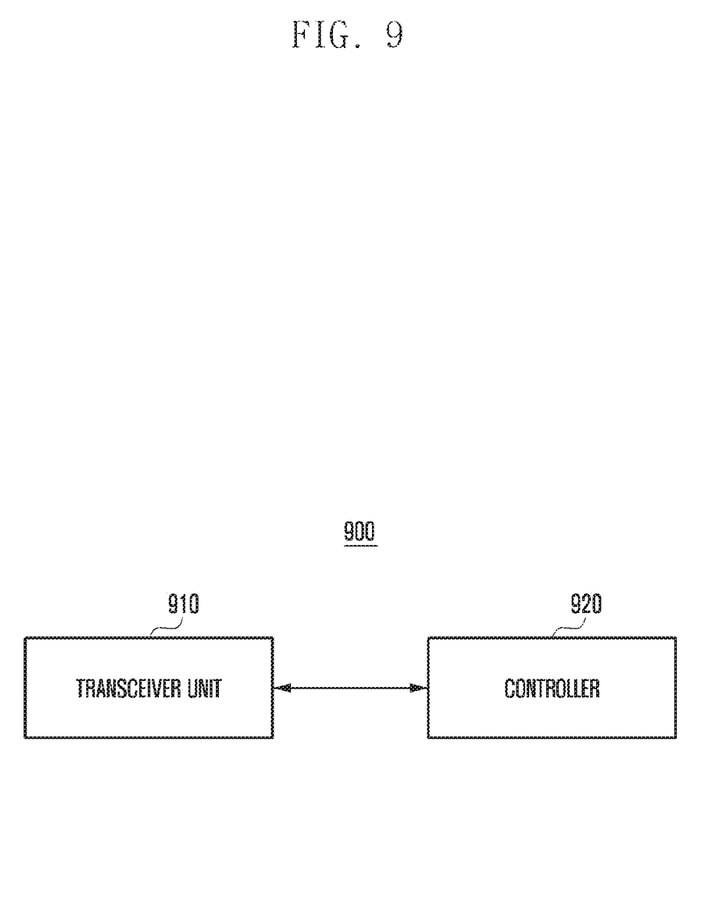
FIG. 9 is a block diagram illustrating components of a receiving device according to an embodiment of the present invention.

FIG. 9 is a block diagram illustrating components of the receiving device 900 according to an embodiment of the present invention. The receiving device of FIG. 9 may be a user terminal or a small base station according to the description.

The transceiver unit 910 may transmit and receive signals. For example, the receiving device 900 may receive a first synchronization signal and a second synchronization signal through the transceiver unit 910. The first synchronization signal may be the primary synchronization signal (PSS), and the second synchronization signal may be the secondary synchronization signal (SSS).

The controller 920 may control the overall operation of the receiving device 900. For example, the controller 920 may generate a first joint signal by concatenating the first synchronization signal and the second synchronization signal received through the transceiver unit 910. Then, the controller 920 may calculate the correlation between the first joint signal and each of a preset number of cell IDs, and may determine the cell ID using the calculated correlations.

Meanwhile, the controller 920 may identify the position at which the cell-specific reference signal (CRS) is transmitted in at least one subframe received through the transceiver unit 910. For example, the controller 920 may identify the resource element (RE) at which the CRS is transmitted.

The controller 920 may concatenate the CRS symbols received at the identified positions for CRS transmission to generate a second joint signal. The controller 920 may calculate the correlation between the second joint signal and each of a preset number of cell IDs and determine the cell ID using the calculated correlations.

In another embodiment, the controller 920 may identify a parameter for at least one of the band class and the bandwidth of the frequency and select the cell ID determination scheme according to the identified parameter.

For example, the controller 920 may determine the cell ID by applying one of the synchronization signal based determination scheme that uses a first joint signal obtained by concatenating a first synchronization signal and a second synchronization signal for cell ID determination, and the CRS-based determination scheme that uses a second joint signal obtained by concatenating CRS symbols for cell ID determination.

Specifically, to determine the cell ID by applying the synchronization signal based determination scheme, the controller 920 may control the transceiver unit 910 to receive the first synchronization signal and the second synchronization signal. Then, the controller 920 may generate a first joint signal by concatenating the first synchronization signal and the second synchronization signal, calculate the correlation between the first joint signal and each of a preset number of cell IDs, and determine the cell ID using the calculated correlations.

To determine the cell ID by applying the CRS-based determination scheme, the controller 920 may identify the position at which the CRS is transmitted in at least one subframe received through the transceiver unit 910. Then, the controller 920 may concatenate the CRS symbols received at the identified positions for CRS transmission to generate a second joint signal, calculate the correlation between the second joint signal and each of a preset number of cell IDs, and determine the cell ID using the calculated correlations.

As described above, the receiving device can overcome the performance limit owing to the LTE standard by performing cell ID determination using a joint signal obtained by concatenating the PSS and the SSS or by concatenating the CRSs.

Meanwhile, the components of the receiving device described above can be implemented in software. For example, the controller of the receiving device may further include a flash memory or other nonvolatile memory. In this nonvolatile memory, programs configured to perform individual functions of the receiving device can be stored.

In addition, the controller of the receiving device may be configured to include a CPU and a random access memory (RAM). The CPU of the controller may copy the programs of the nonvolatile memory onto the RAM and execute the copied programs to perform the above-described functions of a base station.

The controller is responsible for controlling the receiving device. The terms "controller", "central processing unit", "microprocessor", "control unit", "processor", and "operating system" may be interchangeably used. The controller may be implemented as a single-chip system (system-on-a-chip, system on chip, SOC, or SoC) together with other functional elements such as the transceiver unit included in the receiving device.

Meanwhile, in various embodiments, the cell ID determination method of the receiving device described above may be coded in software and stored in non-transitory readable media. Such non-transitory readable media can be installed and used in a variety of devices.

A non-transitory readable medium is not a medium for storing data for a short time such as a register, cache or memory, but refers to a medium that semi-permanently stores data and can be read by a device. Specifically, the non-transitory readable media may include a CD, DVD, hard disk, Blu-ray disc, USB, memory card, and ROM.

Hereinabove, exemplary embodiments of the present invention have been described with reference to the accompanying drawings. However, the present invention is not limited to a specific embodiment described above. It should be understood that many variations and modifications of the basic inventive concept described herein will still fall within the spirit and scope of the present invention as defined in the appended claims and their equivalents.

The invention claimed is:

1. A method of cell ID determination for a receiving device, the method comprising:
   receiving a first synchronization signal and a second synchronization signal;
   generating a first joint signal by concatenating the first synchronization signal and the second synchronization signal;
   determining a plurality of correlations, each correlation determined based on the first joint signal and a reference signal among a plurality of reference signals, each reference signal corresponding to a cell ID of a preset number of cell IDs; and
   determining a cell ID of the preset number of cell IDs based on the plurality of correlations.

2. The method of claim 1, wherein the first synchronization signal is a primary synchronization signal (PSS) and the second synchronization signal is a secondary synchronization signal (SSS).

3. A method of cell ID determination for a receiving device, the method comprising:
   identifying the position at which a cell-specific reference signal (CRS) is transmitted in at least one received subframe;
   generating a second joint signal by concatenating CRS symbols received at the identified position in the at least one received subframe for CRS transmission;
   determining a plurality of correlations, each correlation determined based on the second joint signal and a reference signal among a plurality of reference signals, each reference signal corresponding to a cell ID of a preset number of cell IDs; and
   determining a cell ID of the preset number of cell IDs based on the plurality of correlations.

4. The method of claim 3, wherein the position at which a CRS is transmitted is a specific resource element (RE).

5. A method of cell ID determination for a receiving device, the method comprising:
   identifying a parameter for at least one of the band class and the bandwidth of a frequency; and
   determining a cell ID by applying, according to the identified parameter, one of a synchronization signal-based determination scheme or a CRS-based determination scheme,
   wherein the synchronization signal-based determination scheme uses a first joint signal obtained by concatenating a first synchronization signal and a second synchronization signal for the cell ID determination, and
   wherein the CRS-based determination scheme uses a second joint signal obtained by concatenating CRS symbols for the cell ID determination.

6. The method of claim 5, wherein the determining of the cell ID by applying the synchronization signal-based determination scheme comprises:
   receiving the first synchronization signal and the second synchronization signal;
   generating the first joint signal by concatenating the first synchronization signal and the second synchronization signal;

determining a plurality of correlations, each correlation determined based on the first joint signal and a reference signal among a plurality of reference signals, each reference signal corresponding to a cell ID of a preset number of cell IDs; and determining the cell ID of the preset number of cell IDs based on the plurality of correlations.

7. The method of claim 5, wherein the determining of the cell ID by applying the CRS-based determination scheme comprises:

identifying the position at which a cell-specific reference signal (CRS) is transmitted in at least one received subframe;

generating the second joint signal by concatenating CRS symbols received at the identified position in the at least one received subframe for CRS transmission;

determining a plurality of correlations, each correlation determined based on the second joint signal and a reference signal among a plurality of reference signals, each reference signal corresponding to a cell ID of a preset number of cell IDs; and determining the cell ID of the preset number of cell IDs based on the plurality of correlations.

8. A receiving device comprising:

a transceiver configured to receive a first synchronization signal and a second synchronization signal; and a processor configured to:
generate a first joint signal by concatenating the first synchronization signal and the second synchronization signal,
determine a plurality of correlations, each correlation determined based on the first joint signal and a reference signal among a plurality of reference signals, each reference signal corresponding to a cell ID of a preset number of cell IDs, and
determine a cell ID of the preset number of cell IDs based on the plurality of correlations.

9. The receiving device of claim 8, wherein the first synchronization signal is a primary synchronization signal (PSS) and the second synchronization signal is a secondary synchronization signal (SSS).

10. A receiving device comprising:

a transceiver configured to transmit and receive a signal; and a processor configured to:
identify the position at which a cell-specific reference signal (CRS) is transmitted in at least one subframe received through the transceiver unit,
generate a second joint signal by concatenating CRS symbols received at the identified position in the at least one received subframe for CRS transmission,
determine a plurality of correlations, each correlation determined based on the second joint signal and a reference signal among a plurality of reference signals, each reference signal corresponding to a cell ID of a preset number of cell IDs, and
determine a cell ID of the preset number of cell IDs based on the plurality of correlations.

11. The receiving device of claim 10, wherein the position at which a CRS is transmitted is a specific resource element (RE).

12. A receiving device comprising:

a transceiver unit configured to transmit and receive a signal; and a processor configured to:
identify a parameter for at least one of the band class and the bandwidth of a frequency, and
determine a cell ID by applying, according to the identified parameter, one of a synchronization signal-based determination scheme or a CRS-based determination scheme,
wherein the synchronization signal-based determination scheme uses a first joint signal obtained by concatenating a first synchronization signal and a second synchronization signal for the cell ID determination, and
wherein the CRS-based determination scheme uses a second joint signal obtained by concatenating CRS symbols for cell ID determination.

13. The receiving device of claim 12, wherein, for determining a cell ID by applying the synchronization signal-based determination scheme, the processor is configured to:
receive the first synchronization signal and the second synchronization signal,
generate the first joint signal by concatenating the first synchronization signal and the second synchronization signal,
determine a plurality of correlations, each correlation determined based on the first joint signal and a reference signal among a plurality of reference signals, each reference signal corresponding to a cell ID of a preset number of cell IDs, and
determine the cell ID of the preset number of cell IDs based on the plurality of correlations.

14. The receiving device of claim 12, wherein, for determining a cell ID by applying the CRS-based determination scheme, the processor is configured to:
identify the position at which a cell-specific reference signal (CRS) is transmitted in at least one received subframe,
generate the second joint signal by concatenating CRS symbols received at the identified position in the at least one received subframe for CRS transmission,
determine a plurality of correlations, each correlation determined based on the second joint signal and a reference signal among a plurality of reference signals, each reference signal corresponding to a cell ID of a preset number of cell IDs, and
determine the cell ID of the preset number of cell IDs based on the plurality of correlations.

* * * * *